(12) United States Patent
Moon et al.

(10) Patent No.: US 9,316,405 B2
(45) Date of Patent: Apr. 19, 2016

(54) CYCLONE TYPE HUMIDIFIER AND WET AIR PURIFIER COMBINATION DEVICE USING CENTRIFUGAL FORCE

(71) Applicants: DANA ELECTRONICS CO., LTD., Incheon (KR); DSC CHICAGO CORP, Northbrook, IL (US)

(72) Inventors: Seung-Jun Moon, Incheon (KR); Seung Wook Choe, Northbrook, IL (US)

(73) Assignee: DANA ELECTRONICS CO., LTD., Incheon (KR)

( * ) Notice: Subject to any disclaimer, the term of this patent is extended or adjusted under 35 U.S.C. 154(b) by 92 days.

(21) Appl. No.: 14/328,130

(22) Filed: Jul. 10, 2014

(65) Prior Publication Data

US 2016/0010881 A1 Jan. 14, 2016

(51) Int. Cl.
  *F24F 3/14* (2006.01)
  *F24F 3/16* (2006.01)
  *B01D 53/14* (2006.01)

(52) U.S. Cl.
  CPC ............. *F24F 3/14* (2013.01); *B01D 53/145* (2013.01); *F24F 3/1603* (2013.01); *B01D 2252/103* (2013.01); *F24F 2003/1617* (2013.01); *F24F 2003/1632* (2013.01)

(58) Field of Classification Search
  CPC ... F24F 3/14; F24F 3/1603; F24F 2003/1632; F24F 2003/1617; B01D 53/145; B01D 2252/103
  See application file for complete search history.

(56) References Cited

U.S. PATENT DOCUMENTS

| 3,227,902 | A | * | 1/1966 | Laing | B21D 53/267 310/59 |
| 3,856,279 | A | * | 12/1974 | Yeagle | F24F 6/06 126/113 |
| 4,641,053 | A | * | 2/1987 | Takeda | B05B 17/0615 239/102.2 |
| 4,663,091 | A | * | 5/1987 | Seo | A61L 2/035 210/748.01 |
| 4,752,422 | A | * | 6/1988 | Uchida | A61L 9/122 239/58 |
| 5,483,616 | A | * | 1/1996 | Chiu | F24F 6/043 261/107 |
| 5,677,982 | A | * | 10/1997 | Levine | F24F 1/02 392/391 |
| 5,859,952 | A | * | 1/1999 | Levine | F24F 1/02 239/102.1 |

(Continued)

FOREIGN PATENT DOCUMENTS

| FR | WO 2008122871 A2 | * | 10/2008 | ............. A61L 9/205 |
| GB | 947704 A | * | 1/1964 | .......... F24D 19/0082 |

(Continued)

*Primary Examiner* — Duane Smith
*Assistant Examiner* — Stephen Hobson
(74) *Attorney, Agent, or Firm* — IPLA P.A.; James E. Bame

(57) ABSTRACT

Provided is a cyclone type humidifier and wet air purifier combination device using centrifugal force. The humidifier and purifier combination device includes: a main housing; a blower fan provided under a main housing; a bottom housing which is coupled to the main housing and has an air blowing port, a water level sensor, an ultrasonic vibrator and a circular fixing plate; first and second filters which are disposed in the circular fixing plate; an outer cylindrical body which is coupled to the circular fixing plate and has a discharge pipe and an air inlet; an inner cylindrical body which is coupled to the circular fixing plate and includes an air guide body having a funnel shape with an impurity discharge hole; and an air guide housing configured.

10 Claims, 6 Drawing Sheets

(56) References Cited

U.S. PATENT DOCUMENTS

| | | | | |
|---|---|---|---|---|
| 5,918,804 | A * | 7/1999 | Jung | B05B 17/0615 236/44 A |
| 5,922,247 | A * | 7/1999 | Shoham | B05B 17/0615 239/102.2 |
| 5,997,619 | A * | 12/1999 | Knuth | A61L 9/20 55/356 |
| 7,362,037 | B2 * | 4/2008 | Kang | B05B 17/0615 310/341 |
| 7,712,249 | B1 * | 5/2010 | Modlin | A01M 1/205 239/102.2 |
| 2002/0190400 | A1 * | 12/2002 | Bachert | B01F 3/0407 261/81 |
| 2003/0230477 | A1 * | 12/2003 | Fink | A61L 9/015 204/157.3 |
| 2005/0000365 | A1 * | 1/2005 | Nelsen | A61L 9/16 96/224 |
| 2005/0258554 | A1 * | 11/2005 | Bachert | F24F 6/043 261/3 |
| 2006/0096460 | A1 * | 5/2006 | Kim | B01D 47/06 96/283 |
| 2006/0102003 | A1 * | 5/2006 | Kim | B01F 3/04531 96/284 |
| 2007/0237500 | A1 * | 10/2007 | Wang | F24F 6/00 392/405 |
| 2010/0225012 | A1 * | 9/2010 | Fitton | F24F 1/01 261/116 |
| 2010/0281896 | A1 * | 11/2010 | Al Watban | F24F 5/0035 62/160 |
| 2011/0017212 | A1 * | 1/2011 | Kenyon | A61M 16/00 128/203.26 |
| 2011/0048232 | A1 * | 3/2011 | Langford | F24F 3/1603 95/149 |
| 2011/0226868 | A1 * | 9/2011 | Modlin | A01N 1/205 239/102.1 |
| 2012/0112371 | A1 * | 5/2012 | Kanel | F24F 6/02 261/28 |
| 2012/0234166 | A1 * | 9/2012 | Markham | A61L 9/20 95/214 |
| 2012/0319311 | A1 * | 12/2012 | Nutter | F24F 6/02 261/72.1 |

FOREIGN PATENT DOCUMENTS

| | | | | |
|---|---|---|---|---|
| GB | 2237754 A * | 5/1991 | | F24F 3/1603 |
| JP | 01169251 A * | 7/1989 | | |
| JP | 10057859 A * | 3/1998 | | |
| JP | 10281507 A * | 10/1998 | | |
| JP | 2003161473 A * | 6/2003 | | |
| JP | 2006025962 A * | 2/2006 | | |
| JP | 2006125648 A * | 5/2006 | | |
| JP | 4502054 B2 * | 7/2010 | | F24F 3/14 |
| KR | 1020030003677 | 1/2003 | | |
| KR | 20040021000 A * | 3/2004 | | A47L 5/38 |
| KR | 1020130091944 | 8/2013 | | |
| KR | 1020130119336 | 10/2013 | | |
| KR | EP 2810921 A1 * | 12/2014 | | C02F 1/42 |

* cited by examiner

CYCLONE TYPE HUMIDIFIER AND WET AIR PURIFIER COMBINATION DEVICE USING CENTRIFUGAL FORCE

BACKGROUND OF THE INVENTION

1. Field of the Invention

The present invention relates generally to wet air purifiers and, more particularly, to a cyclone type humidifier and wet air purifier combination device using centrifugal force which purifies air in such a way that an ultrasonic vibrator atomizes stored water in a streamlined air guide housing to form fine water particles, and the fine water particles are used to remove pollutants from air, so that air can be purified under optimal conditions, whereby electric energy consumption can be reduced, and purification and dust collection efficiencies can be enhanced even without using an expensive filter, and which can also be used as a humidifier as needed.

2. Description of the Related Art

Generally, air purifiers circulate air in buildings and remove various pollutants from the indoor air, thus making the indoor air pleasant. The pollutants contained in the air refer to air pollution substances originating from external sources such as dust storms, vehicle exhaust gas, dust from construction, etc., and internal pollutants contained in air of living spaces and manufacturing facilities, etc. In addition, the pollutants may also include other types of air pollutants with various origins.

The air purifiers for purifying indoor air are classified into dry air purifiers and wet air purifiers.

A representative example of a dry air purifier is an air purifier using a filter. In the case of a method using a filter, the filter cannot completely catch fine particle dust and remove it from air. Further, as dust which has been contained in air is accumulated on the surface of the filter, the filter is gradually clogged, whereby dust collection efficiency is markedly reduced, and it may become a seedbed for pathogenic bacterium or viruses. Therefore, there is a difficulty in maintenance because periodic filter replacement is required. Furthermore, discarded filters causes secondary environmental pollution.

In addition, photocatalytic, electric precipitation or plasma gas purifiers are examples of another kind of dry air purifier. However, this kind of dry air purifier has a disadvantage of low purification efficiency. Furthermore, anion generation gas purifiers have been reported as creating ozone which may be harmful to the human body.

In an effort to overcome the above-mentioned problems, wet air purifiers which use a cleaning agent to collect pollutants and remove them from air have been proposed. Typically, an air treatment method of such a wet cleaning air purifier includes spraying a cleaning agent into the air to adsorb pollutant particles and remove them from air.

That is, the wet cleaning air purifier purifies air in such a way that the purifier draws indoor air and outdoor air to circulate the indoor air and sprays a cleaning agent using a spraying device when the drawn air passes through an air filter installed in the purifier, thus filtering out pollutants from the air.

Furthermore, wet cleaning air purifiers, which spray water onto an air filter from an upper or lower side of the air filter to clean the air filter and simultaneously purify air, have been introduced. However, because conventional wet cleaning air purifiers use typical dry air purification equipment as it is and spray water before or after circulating indoor air, and then outdoor air passes through the air filter so that pollutants can be filtered out from the air by means of water and the air filter, most pollutants which are contained in air are caught by the air filter, and therefore the air filter must be frequently washed or replaced with a new one. As such, conventional wet cleaning air purifiers are also disadvantageous in that filter maintenance is continuously required.

Furthermore, since the above-mentioned conventional cleaning air purifiers use only a single filter and a single spraying device to filter out pollutants from air, the purification effect is unsatisfactory. In other words, the efficiency of removing pollutants from air is relatively low.

To overcome the above-stated conventional problems, a cleaning air purifier was proposed in Korean Patent Registration No. 100482926. This cleaning air purifier filters out pollutants from air in such a way that filtering water is sprayed two times towards air drawn into the air purifier. In a first filtering water spraying process, only filtering water is used to filter out pollutants from air. In a second filtering water spraying process, filtering water is sprayed onto a filter which is installed in the air purifier, whereby impurities can be more reliably filtered out from air passing through the filter and, simultaneously, the filtering water can also clean the filter that is used to filter out pollutants from air.

Therefore, although the cleaning air purifier of No. 100482926 sprays filtering water twice, removing pollutants from air is substantially performed only by the filter. Thus, if the filter is not reliably cleaned, the air flow rate or air filtering efficiency is reduced, which is problematic.

Particularly, all of the conventional air purifiers including the cleaning air purifier of No. 100482926 use a filter as a main air filtering means. If such a conventional air purifier is used to purify air in work sites in which gas containing high viscosity pollutants or volatile materials such as paint having high viscosity and relatively coarse particles are used, even though enough water is sprayed to the filter, high viscosity pollutants eventually adhere to the filter. In addition, once high viscosity pollutants are adhered to the filter they rapidly adsorb other high viscosity pollutants because of high cohesiveness between such high viscosity pollutants. As a result, the filter becomes clogged and it becomes impossible for the filter to perform its intended function.

Furthermore, if high viscosity gas or volatile materials such as paint having high viscosity adhere to the filter, and because it is very difficult to remove high viscosity materials from the filter, the filter may have to be replaced with a new one. Moreover, in conventional wet air purifiers including the cleaning air purifier of No. 100482926, a method of merely spraying fine water particles is used to purify air. Because the force by which water is sprayed from a nozzle is relatively small, only pollutants which are adsorbed by fine water particles sprayed from the nozzle are dropped downwards and removed from air. Therefore, the efficiency of removing pollutants from air is so low that use of the filter is required.

In addition, the cleaning air purifier of No. 100482926 and other conventional air purifiers are only for use as a purifier. If a humidification function is needed, use of a separate humidifier is required.

SUMMARY OF THE INVENTION

Accordingly, the present invention has been made keeping in mind the above problems occurring in the prior art, and an object of the present invention is to provide a cyclone type humidifier and wet air purifier combination device using centrifugal force which purifies air in such a way that an ultrasonic vibrator atomizes stored water in a streamlined air guide housing to form fine water particles, and the fine water particles are used to remove pollutants from air, so that air can be purified under optimal conditions, whereby electric energy consumption can be reduced, and purification and dust collection efficiencies can be enhanced even without using an expensive filter, and which can also be used as a humidifier as needed.

In order to accomplish the above object, the present invention provides a cyclone type humidifier and wet air purifier combination device using centrifugal force, including: a main housing provided with a rotating plate provided in a central portion of a top surface of the main housing; a blower fan provided at a predetermined position outside the main housing or below the main housing, the blower fan blowing air by means of operation of a motor; a bottom housing removably coupled to a lower end of the main housing, the bottom housing having at a predetermined position an air blowing port through which air drawn from the blower fan can be sent into the bottom housing, with a water level sensor provided at a position in a bottom surface of the bottom housing, an ultrasonic vibrator provided at another position in the bottom surface of the bottom housing, and a circular fixing plate fixed in a central portion of the bottom surface of the bottom housing, the circular fixing plate having a first insert depression formed in an outer circumferential part of the circular fixing plate, a second insert depression formed in an inner circumferential part of the circular fixing plate, a first coupling depression formed between the first insert depression and the second insert depression, and a second insert depression formed in a central portion of the fixing plate inside the second insert depression; a first filter and a second filter respectively and removably disposed in the first coupling depression and the second coupling depression; an outer cylindrical body removably fitted into the first insert depression, the outer cylindrical body including a discharge pipe coupled to a central portion of an upper surface of the outer cylindrical body, with an outlet formed in the discharge pipe, a plurality of water passing notches formed in a circumferential edge of a lower end of the outer cylindrical body at positions spaced apart from each other at predetermined intervals, and an air inlet formed in the lower end of the outer cylindrical body so that air drawn from the air blowing port is supplied into the outer cylindrical body; an inner cylindrical body removably fitted into the second insert depression, the inner cylindrical body having a cylindrical shape that is open on upper and lower ends thereof, with a plurality of water passing notches formed in a circumferential edge of a lower end of the inner cylindrical body at positions spaced apart from each other at predetermined intervals, and an air guide body integrally provided on an inner circumferential surface of the inner cylindrical body, the air guide body having a funnel shape that is reduced in diameter from an upper end thereof to a lower end, with an impurity discharge hole formed in the lower end of the air guide body; and an air guide housing provided on an outer circumferential surface of the outer cylindrical body, the air guide housing being configured such that air drawn from the air blowing port can be supplied into the air inlet of the outer cylindrical body after being mixed with fine water particles generated by the ultrasonic vibrator, wherein the air blowing port, the water level sensor and the ultrasonic vibrator are disposed in the air guide housing, wherein water is contained in the outer cylindrical body, the inner cylindrical body and the air guide housing.

The rotating plate may include a plurality of blades in a perimeter thereof, the blades radially extending outwards, and a plurality of through hole may be formed in the rotating plate inside the blades.

The first filter may have a doughnut shape, and the second filter may have a circular plate shape, wherein each of the first and second filters is configured so as to be removable from the circular fixing plate.

An air flow guide plate may be provided at a position adjacent to the air inlet between an inner circumferential surface of the outer cylindrical body and an outer circumferential surface of the inner cylindrical body so that a mixture of air drawn into the outer cylindrical body through the air inlet and the fine water particles can be rotated by centrifugal force.

The air blowing port may be closed by a partition wall protruding from the bottom surface of the bottom housing to a predetermined height and be open in an upper portion thereof so that air drawn from the blower fan can smoothly flow through the air blowing port and be prevented from being affected by the water stored in the bottom housing.

The ultrasonic vibrator may generate vibrations in the stored water and thus induce an ultrasonic atomization phenomenon so that atomized water makes contact with drawn air, thereby primarily removing pollutants from the drawn air.

The air guide housing may have a streamline shape to make a flow of air drawn from the air blowing port smooth.

A water contamination sensor may be provided in the air guide housing, the water contamination sensor checking whether the stored water is contaminated.

The cyclone type humidifier and wet air purifier combination device may be configured to be adjusted in function in such a way that when an RPM of the motor is comparatively low, a humidifier function is conducted, and when the RPM of the motor is comparatively high, an air purifier function is conducted.

A water discharge prevention ring may be provided on an inner circumferential surface of the discharge pipe.

In a cyclone type humidifier and wet air purifier combination device using centrifugal force according to the present invention, air containing pollutants, which is drawn through an air blowing port, flows along the periphery of a streamlined air guide housing and mixes with fine water particles which are generated by an ultrasonic vibrator. Thereafter, large centrifugal force is applied to the air containing pollutants and the fine water particles by an air blowing force when they pass through a narrow space between an outer cylindrical body and an inner cylindrical body. This centrifugal force creates a cyclone type rotation of air. During this process, some fine water particles are converted to water droplets by the cyclone-type rotating force. While fine water particles are converted to water droplets, pollutants are adsorbed by the water droplets. According to the cyclone principle in which light substances are moved upwards and heavy substances are dropped downwards, water droplets in which pollutants have been adsorbed are dropped downwards and filtered by a first filter. Simultaneously, some air purified in the outer cylindrical body is moved upwards and drawn into an air guide body having a funnel shape reduced in diameter from the top to the bottom. In the air guide body, a rotating force is rapidly increased so that pollutants adhere to the inner circumferential surface of the air guide body. In addition, some fine water particles are converted to water droplets by cyclone of larger centrifugal force in the air guide body, and pollutants are adsorbed by water droplets during the conversion process. Water droplets in which pollutants have been adsorbed are dropped downwards by the cyclone principle and then moved to a second filter via an impurity discharge hole. The water droplets are filtered by the second filter, while purified air is discharged through the outlet. Therefore, the present invention can reduce energy consumption and enhance filtering and dust collection efficiencies. Furthermore, the present invention can be changed in its function by controlling the RPM of the motor in such a way that when the RPM is relatively high, it conducts the above-mentioned air purification function, and when the RPM is relatively low, it functions as a humidifier.

In addition, the inner cylindrical body, the outer cylindrical body, the first filter and the second filter are configured such that they can be easily separably assembled with each other. Thus, it is easy to wash the elements so as to remove foreign substances, which are generated during the pollutant adsorption process using centrifugal force, as well as other adsorbed pollutants. Therefore, a user can easily disassemble the elements from each other and assemble them with each other whenever washing the elements is required, whereby the elements can be maintained and used in a clean state for a long period of time.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a cyclone type humidifier and wet air purifier combination device using centrifugal force according to an embodiment of the present invention will be described in detail with reference to the attached drawings.

Figure 1:
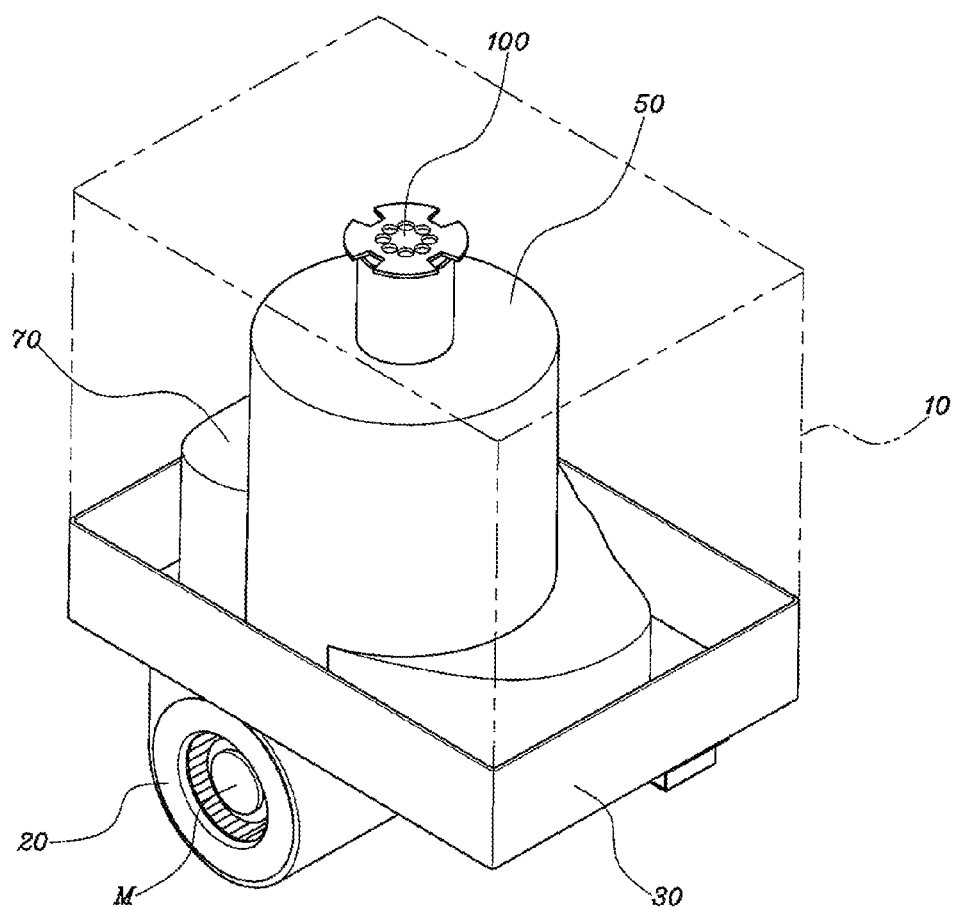
FIG. 1 is a schematic perspective view illustrating a cyclone type humidifier and wet air purifier combination device using centrifugal force according to the present invention.
Figure 2:
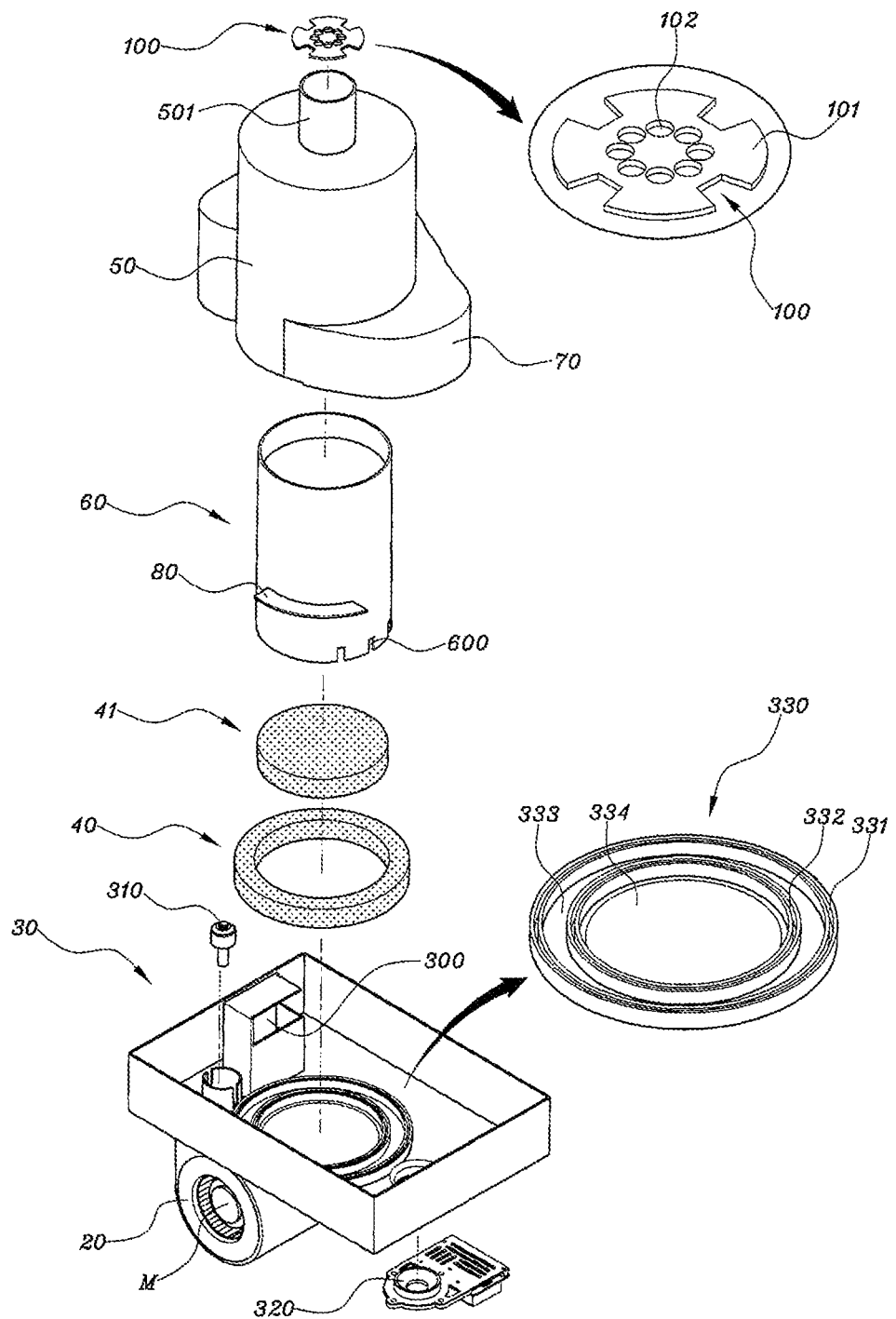
FIG. 2 is an exploded perspective view illustrating the cyclone type humidifier and wet air purifier combination device using centrifugal force according to the present invention.
Figure 3:
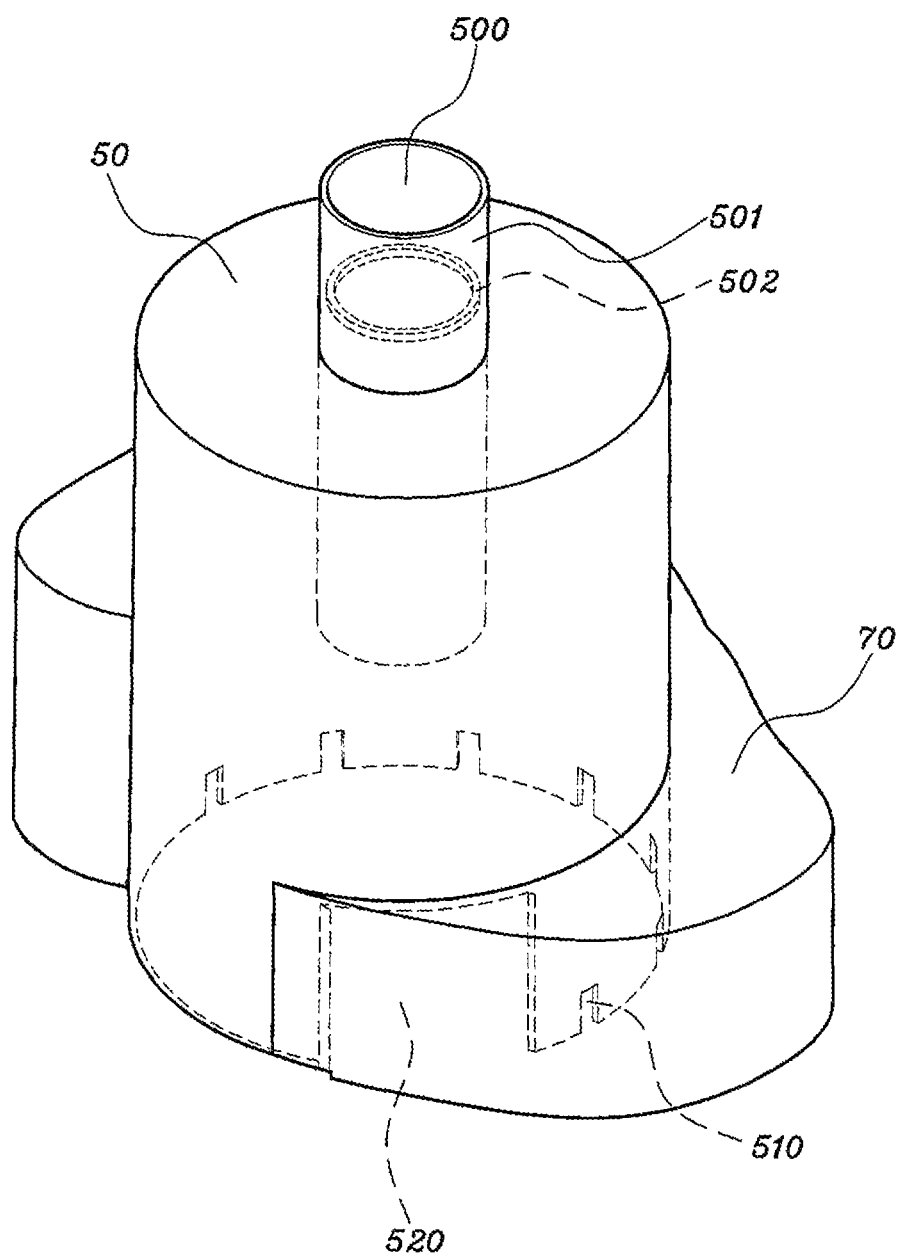
FIG. 3 is a perspective view illustrating a critical portion of the cyclone type humidifier and wet air purifier combination device using centrifugal force according to the present invention.
Figure 4:
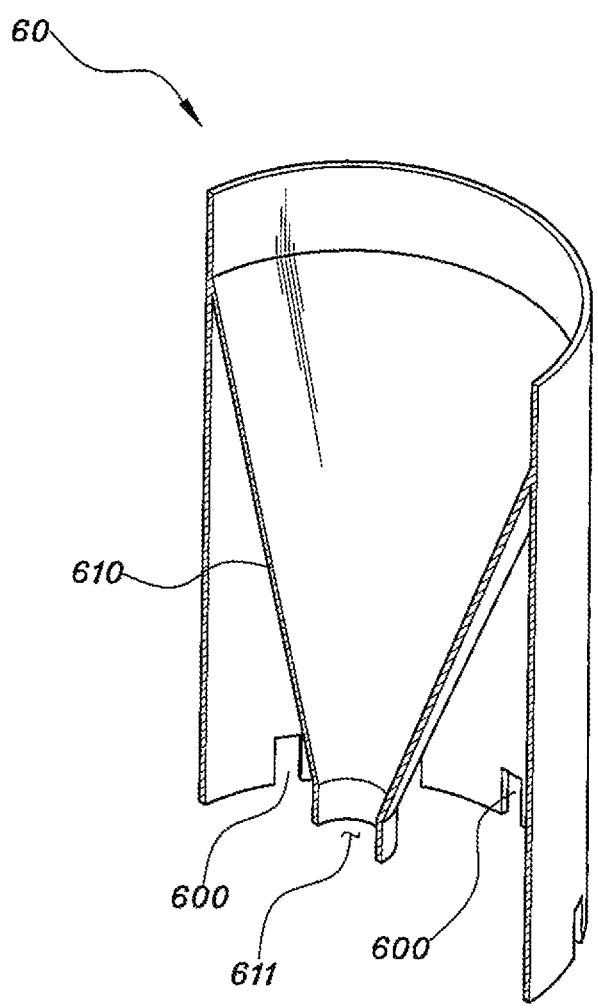
FIG. 4 is an exploded perspective view showing a portion of an inner cylindrical body of the cyclone type humidifier and wet air purifier combination device using centrifugal force according to the present invention.
Figure 5:
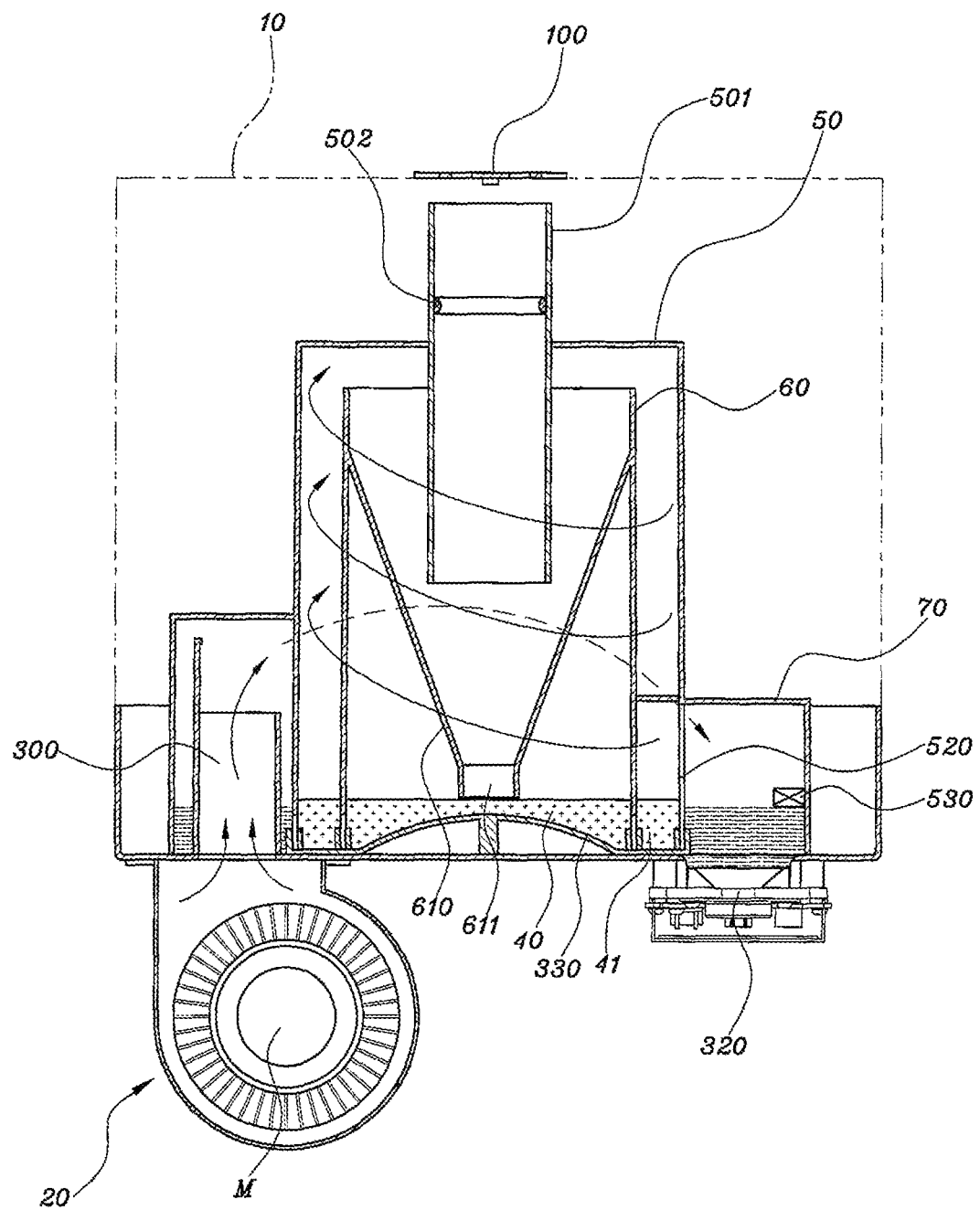
FIG. 5 is a sectional view illustrating the cyclone type humidifier and wet air purifier combination device using centrifugal force according to the present invention.
Figure 6:
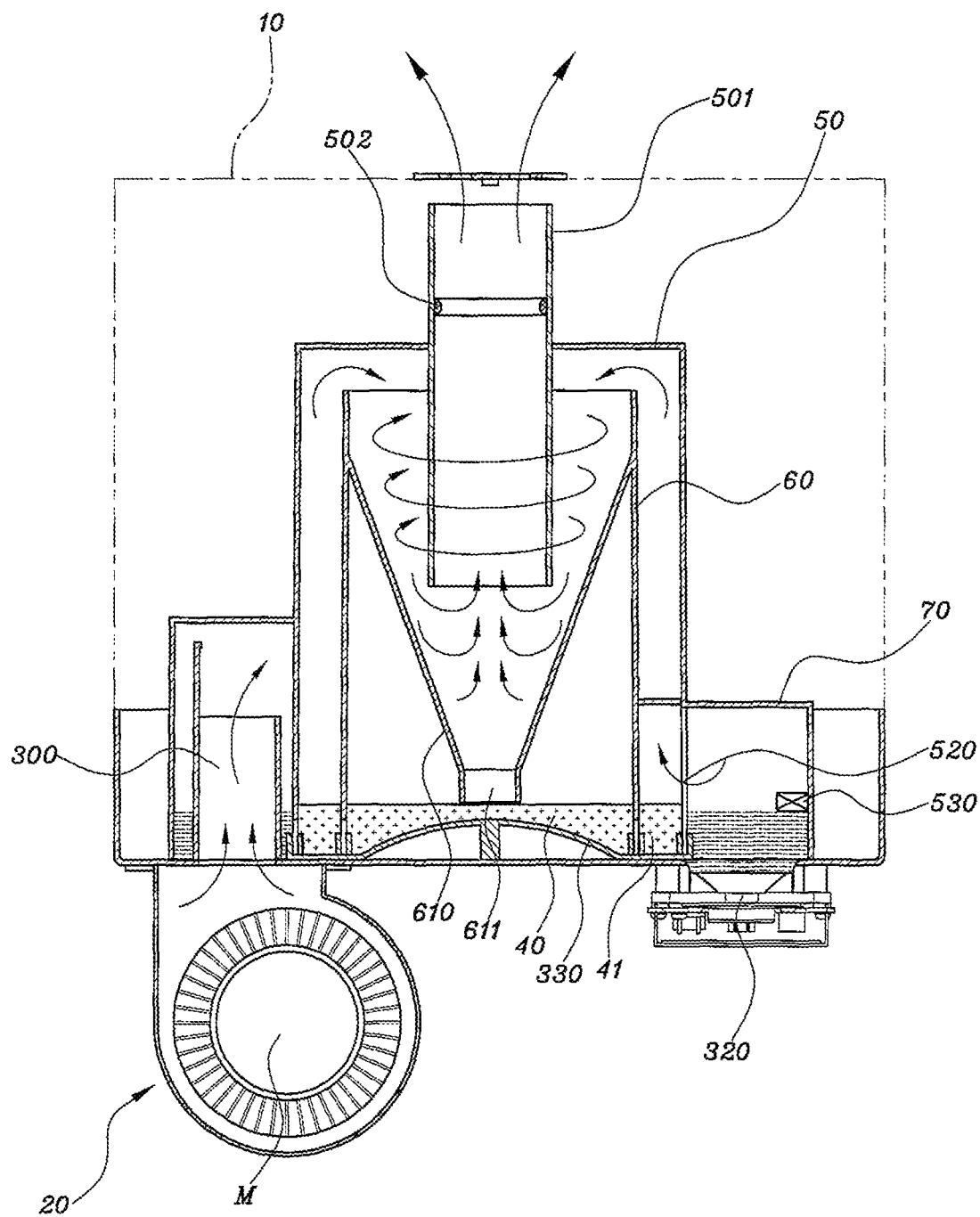
FIG. 6 is a sectional view showing the operation of the cyclone type humidifier and wet air purifier combination device using centrifugal force according to the present invention.

FIG. 1 is a schematic perspective view illustrating the cyclone type humidifier and wet air purifier combination device using centrifugal force according to the present invention. FIG. 2 is an exploded perspective view illustrating the cyclone type humidifier and wet air purifier combination device using centrifugal force according to the present invention. FIG. 3 is a perspective view illustrating a critical portion of the cyclone type humidifier and wet air purifier combination device using centrifugal force according to the present invention. FIG. 4 is an exploded perspective view showing a portion of an inner cylindrical body of the cyclone type humidifier and wet air purifier combination device using centrifugal force according to the present invention. FIG. 5 is a sectional view illustrating the cyclone type humidifier and wet air purifier combination device using centrifugal force according to the present invention. FIG. 6 is a sectional view showing the operation of the cyclone type humidifier and wet air purifier combination device using centrifugal force according to the present invention.

For the sake of explanation, the term "cyclone type humidifier and wet air purifier combination device" is referred to simply as a "humidifier and purifier combination device."

Hereinafter, the construction of the humidifier and purifier combination device according to the present invention will be described in detail with reference to the attached drawings. Reference numeral 10 indicates a main housing. As shown in FIG. 1, a rotating plate 100 is coupled to a central portion of a top surface of the main housing 10. The shape of the main housing 10 can be changed in a variety of ways rather than being limited to that illustrated in the drawing.

The rotating plate 100 includes blades 101 which radially extend outwards. A plurality of through holes 102 are formed in the rotating plate 100 inside the blades 101. The rotating plate 100 rotates or stops depending on a flow rate and speed at which air passes through the rotating plate 100.

Reference numeral 20 indicates a blower fan. The blower fan 20 is installed under the main housing 10 or at a predetermined position outside the main housing 10. The blower fan 20 blows air when a motor M is operated. Although the blower fan 20 is illustrated in the drawing as being disposed under a lower surface of the main housing 10, the location thereof can be changed in various ways and, for example, it may be disposed on a sidewall of the main housing 10.

Reference numeral 30 indicates a bottom housing. As shown in FIG. 2, the bottom housing 30 is disposed under the main housing 10 and is detachably coupled to the main housing 10. The bottom housing 30 includes in a predetermined portion thereof an air blowing port 300 through which air drawn from the blower fan 20 can be sent into the bottom housing 30. A water level sensor 310 is provided at a position in the bottom surface of the bottom housing 30. An ultrasonic vibrator 320 is provided at another position in the bottom surface of the bottom housing 30. A circular fixing plate 330 is fixed in a central portion of the bottom housing 30. The circular fixing plate 330 has: a first insert depression 331 which is formed in an outer circumferential part of the circular fixing plate 330; a second insert depression 332 which is formed in an inner circumferential part of the circular fixing plate 330; a first coupling depression 333 which is formed between the first insert depression 331 and the second insert depression 332; and a second insert depression 334 which is formed in a central portion of the fixing plate 330 inside the second insert depression 332.

As shown in FIGS. 2, 5 and 6, the air blowing port 300 is configured in such a way that it is closed by a partition wall protruding from the bottom surface of the bottom housing 30 to a predetermined height and is open in an upper portion thereof, whereby air drawn from the blower fan 20 can smoothly flow through the air blowing port 300 and be prevented from being affected by water stored in the bottom housing 30.

The ultrasonic vibrator 320 generates vibrations in the stored water and thus induces an ultrasonic atomization phenomenon so that atomized water makes contact with air drawn into the housing, thereby primarily removing pollutants from the drawn air.

Preferably, the present invention is configured to be adjusted in its function in such a way that when the RPM of the motor M is comparatively low, it functions as a humidifier, and when the RPM of the motor M is comparatively high, it functions as an air purifier. In detail, when the RPM of the motor M is comparatively low, the rotating plate 100 is not rotated. In this case, the present invention functions as a humidifier in such a way that produced mist is merely discharged to the outside through an outlet 500. On the other hand, if the RPM of the motor M comparatively high, the rotating plate 100 is rotated so that the present invention functions as an air purifier. It will be described again herein below.

Reference numerals 40 and 41 respectively indicate a first filter and a second filter. As shown in FIG. 2, the first filter 40 is removably inserted into the first coupling depression 333, and the second filter 41 is removably inserted into the second coupling depression 334.

Therefore, the first filter 40 has a doughnut shape and the second filter 41 has a circular plate shape.

Reference numeral 50 indicates an outer cylindrical body. As shown in FIGS. 3, 5 and 6, the outer cylindrical body 50 is removably fitted into the first insert depression 331. A discharge pipe 501 in which the outlet 500 is formed is coupled to a central portion of an upper surface of the outer cylindrical body 50. A plurality of water passing notches 510 are formed in a circumferential edge of a lower end of the outer cylindrical body 50 at positions spaced apart from each other at predetermined intervals. An air inlet 520 is formed in the lower end of the outer cylindrical body 50 so that air which is drawn from the air blowing port 300 can be supplied into the outer cylindrical body 50.

Preferably, a water discharge prevention ring 502 is provided on an inner circumferential surface of the discharge pipe 501, thus preventing water from being moved upwards along the inner circumferential surface of the discharge pipe 501 by large centrifugal force and discharged out of the discharge pipe 501.

Reference numeral 60 denotes an inner cylindrical body. As shown in FIGS. 4, 5 and 6, the inner cylindrical body 60 is detachably fitted into the second insert depression 332 and has a cylindrical shape, which is open on upper and lower ends thereof. A plurality of water passing notches 600 are formed in a circumferential edge of a lower end of the inner cylindrical body 60 at positions spaced apart from each other at predetermined intervals. An air guide body 610 is integrally provided on the inner circumferential surface of the inner cylindrical body 60. The air guide body 610 has a funnel shape, which is reduced in diameter from the top to the bottom. An impurity discharge hole 611 is formed in the lower end of the air guide body 610.

Preferably, an air flow guide plate 80 is provided at a position adjacent to the air inlet 520 between the inner circumferential surface of the outer cylindrical body 50 and the outer circumferential surface of the inner cylindrical body 60 so that air drawn from the air inlet 520 can be rotated by centrifugal force in the outer cylindrical body 50.

Reference numeral 70 indicates an air guide housing. As shown in FIG. 3, the air guide housing 70 is provided on the outer circumferential portion of the outer cylindrical body 50. The air guide housing 70 is configured such that air drawn from the air blowing port 300 can be moved in a streamlined form and supplied into the air inlet 520 of the outer cylindrical body 50. The air blowing port 300, the water level sensor 310 and the ultrasonic vibrator 320 are provided in the air guide housing 70.

As such, the air guide housing has a streamlined shape to make the flow of air drawn from the air blowing port 300 smooth.

More preferably, a water contamination sensor 530 which checks whether the stored water is contaminated is provided in the air guide housing 70.

Water is stored in the outer cylindrical body 50, the inner cylindrical body 60 and the air guide housing 70.

Hereinafter, the operation of the present invention will be described with reference to the attached drawings.

The first filter 40 is installed in the first coupling depression 333 of the circular fixing plate 330 fixed to the bottom housing 30. The second filter 41 is installed in the second coupling depression 334. Thereafter, the outer cylindrical body 50 is fitted into the first insert depression 331. The inner cylindrical body 60 is fitted into the second insert depression 332.

Subsequently, as shown in FIGS. 5 and 6, water is supplied into and stored in the outer cylindrical body 50, the inner cylindrical body 60 and the air guide housing 70.

The level of stored water is determined by the water level sensor 310.

In this state, as shown in FIG. 5, when the motor M is operated to drive the blower fan 20, external air containing pollutants is drawn into the air guide housing 70 via the air blowing port 300. Drawn into the air guide housing 70, the air containing pollutants flows along the side surface of the air guide housing 70 that has a streamlined shape.

Thereafter, when the air containing pollutants that is guided along the air guide housing 70 reaches a position adjacent to ultrasonic vibrator 320 that has been atomizing the stored water by means of ultrasonic waves since the operation of the motor M started, the air containing pollutants is mixed with fine water particles that are generated by the ultrasonic atomization, and then is drawn into the air inlet 520.

Drawn into the air inlet 520, the air containing pollutants that has been mixed with fine water particles is rotated, under guidance of the air flow guide plate 80, in a cyclone form by centrifugal force between the inner circumferential surface of the outer cylindrical body 50 and the outer circumferential surface of the inner cylindrical body 60. During this process, some pollutants of the air are adhered to the inner circumferential surface of the outer cylindrical body 50. Some fine water particles are converted to water droplets by cyclone-type rotating force. The water droplets, along with the pollutants that have been adhered to the outer cylindrical body 50, flow downwards along the inner circumferential surface of the outer cylindrical body 50 because of their own weight. As a result, the pollutants are caught by the first filter 40 that is disposed at the lower end of the outer cylindrical body 50. Meanwhile, air that has been relatively purified is continuously rotated and moved upwards by large centrifugal force and then drawn into the inner cylindrical body 60 through the open upper end of the inner cylindrical body 60. Here, the air guide body 610, having a funnel shape reduced in diameter from the top to the bottom, is provided in the inner cylindrical body 60. Therefore, the speed of air drawn into the air guide body 610 further increases because of the inner cylindrical body 60 is gradually reduced in diameter, so that the centrifugal force is also further increased, whereby a cyclone flow with a larger centrifugal force is generated. Thereby, pollutants are adhered to the inner surface of the air guide body 610. In the same manner, in the air guide body 610, some fine water particles are converted to water droplets by the cyclone-type rotating force. The water droplets, along with the pollutants that have been adhered to the air guide body 610, flow downwards and towards the impurity discharge hole 611 because of their own weight. As a result, the pollutants are caught by the second filter 41 that is disposed below the impurity discharge hole 611.

Meanwhile, purified air, from which pollutants have been removed, is moved upwards while being increased in rotational force due to the shape of the air guide body 610.

Thereafter, the purified air is discharged to the outside through the outlet 500 while rotating the rotating plate 100. As a result, fresh air, that is, purified air, can be supplied out of the humidifier and purifier combination device.

The humidifier and purifier combination device according to the present invention functions as an air purifier or a humidifier depending on the RPM of the motor M.

If the RPM of the motor M is relatively high, the air flow rate of the air blowing port 300 is increased to a relatively high level. Therefore, when air containing pollutants mixed with fine water particles generated by the ultrasonic vibrator 320 is drawn into the air guide body 610 of the inner cylindrical body 60 after having rotated between the outer cylindrical body 50 and the inner cylindrical body 60, a cyclone of a very large centrifugal force is generated. Then, fine water particles are converted to water droplets by the large centrifugal force. In this case, the air containing pollutants that has been mixed with fine water particles is not discharged out of the outlet 500. Because of the principle of a cyclone with a very large centrifugal force, pollutants in the air, along with the converted water droplets, are dropped downwards towards the impurity discharge hole 611 of the air guide body 610 by their own weight. As a result, pollutants can be reliably filtered out, and only purified air can be discharged out of the outlet 500. As such, the humidifier and purifier combination device functions as an air purifier.

On the other hand, if the RPM of the motor M is relatively low, the air flow rate of the air blowing port 300 is reduced to a relatively low level. In this case, while air containing pollutants is mixed with fine water particles generated by the ultrasonic vibrator 320 is drawn into the air guide body 610 of the inner cylindrical body 60 after having rotated between the outer cylindrical body 50 and the inner cylindrical body 60, comparatively heavy pollutants are dropped towards the impurity discharge hole 611 because of a relatively small cyclone centrifugal force and then caught by the second filter 41. Purified air and some fine water particles mixed with the purified air are discharged to the outside through the outlet 500, thus generating mist. In this way, the humidifier and purifier combination device functions as a humidifier.

As described above, in the present invention, air containing pollutants which is drawn through an air blowing port flows along the periphery of a streamlined air guide housing and mixes with fine water particles which are generated by an ultrasonic vibrator. Thereafter, the air containing pollutants that has been mixed with fine water particles is drawn into an air inlet and then rotated, under guidance of an air flow guide plate, in a cyclone form by centrifugal force between an inner circumferential surface of an outer cylindrical body and an outer circumferential surface of an inner cylindrical body. During this process, some pollutants of the air adhere to the inner circumferential surface of the outer cylindrical body. Some fine water particles are converted to water droplets by the cyclone-type rotating force. The water droplets, along with the pollutants that have adhered to the outer cylindrical body, flow downwards along the inner circumferential surface of the outer cylindrical body because of their own weight. As a result, the pollutants are caught by a first filter that is disposed at the lower end of the outer cylindrical body. Simultaneously, air that has been relatively purified is continuously rotated and moved upwards by large centrifugal force and then drawn into the inner cylindrical body through the open upper end of the inner cylindrical body. Here, because the air guide body, having a funnel shape reduced in diameter from the top to the bottom, is provided in the inner cylindrical body, the speed of air drawn into the air guide body further increases because the inner cylindrical body is gradually reduced in diameter, so that a centrifugal force is also further increased, whereby a cyclone flow with larger centrifugal force is generated. Thereby, pollutants adhere to the inner surface of the air guide body. In the same manner, in the air guide body, some fine water particles are converted to water droplets by the cyclone-type rotating force. The water droplets, along with the pollutants that have adhered to the air guide body, flow downwards and towards the impurity discharge hole because of their own weight. The pollutants are caught by a second filter which is disposed below the impurity discharge hole. Simultaneously, purified air is discharged to the outside through the outlet. Therefore, the present invention can reduce energy consumption and enhance filtering and dust collection efficiency. Furthermore, the present invention can be changed in its function by controlling the RPM of the motor in such a way that when the RPM is relatively high, it conducts the above-mentioned air purification function, and when the RPM is relatively low, it functions as a humidifier.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A cyclone type humidifier and wet air purifier combination device using centrifugal force, comprising:
   a main housing provided with a rotating plate provided in a central portion of a top surface of the main housing;
   a blower fan provided at a predetermined position outside the main housing or below the main housing, the blower fan blowing air by means of operation of a motor;
   a bottom housing removably coupled to a lower end of the main housing, the bottom housing having at a predetermined position an air blowing port through which air drawn from the blower fan can be sent into the bottom housing, with a water level sensor provided at a position in a bottom surface of the bottom housing, an ultrasonic vibrator provided at another position in the bottom surface of the bottom housing, and a circular fixing plate fixed in a central portion of the bottom surface of the bottom housing, the circular fixing plate having: a first insert depression formed in an outer circumferential part of the circular fixing plate; a second insert depression formed in an inner circumferential part of the circular fixing plate; a first coupling depression formed between the first insert depression and the second insert depression; and a second coupling depression formed in a central portion of the fixing plate inside the second insert depression;
   a first filter and a second filter respectively and removably disposed in the first coupling depression and the second coupling depression;
   an outer cylindrical body removably fitted into the first insert depression, the outer cylindrical body including: a discharge pipe coupled to a central portion of an upper surface of the outer cylindrical body, with an outlet formed in the discharge pipe; a plurality of water passing notches formed in a circumferential edge of a lower end of the outer cylindrical body at positions spaced apart from each other at predetermined intervals; and an air inlet formed in the lower end of the outer cylindrical body so that air drawn from the air blowing port is supplied into the outer cylindrical body;
   an inner cylindrical body removably fitted into the second insert depression, the inner cylindrical body having a cylindrical shape that is open on upper and lower ends thereof, with a plurality of water passing notches formed in a circumferential edge of a lower end of the inner cylindrical body at positions spaced apart from each other at predetermined intervals, and an air guide body integrally provided on an inner circumferential surface of the inner cylindrical body, the air guide body having a funnel shape that is reduced in diameter from an upper end thereof to a lower end, with an impurity discharge hole formed in the lower end of the air guide body; and an air guide housing provided on an outer circumferential surface of the outer cylindrical body, the air guide housing being configured such that air drawn from the air blowing port can be supplied into the air inlet of the outer cylindrical body after being mixed with fine water particles generated by the ultrasonic vibrator, wherein the air blowing port, the water level sensor and the ultrasonic vibrator are disposed in the air guide housing, wherein water is contained in the outer cylindrical body, the inner cylindrical body and the air guide housing.

2. The cyclone type humidifier and wet air purifier combination device as set forth in claim 1, wherein the rotating plate includes a plurality of blades in a perimeter thereof, the blades radially extending outwards, and a plurality of through hole are formed in the rotating plate inside the blades.

3. The cyclone type humidifier and wet air purifier combination device as set forth in claim 1, wherein the first filter has a doughnut shape, and the second filter has a circular plate shape, wherein each of the first and second filters is configured so as to be removable from the circular fixing plate.

4. The cyclone type humidifier and wet air purifier combination device as set forth in claim 1, wherein an air flow guide plate is provided at a position adjacent to the air inlet between an inner circumferential surface of the outer cylindrical body and an outer circumferential surface of the inner cylindrical body so that a mixture of air drawn into the outer cylindrical body through the air inlet and the fine water particles can be rotated by centrifugal force.

5. The cyclone type humidifier and wet air purifier combination device as set forth in claim 1, wherein the air blowing port is closed by a partition wall protruding from the bottom surface of the bottom housing to a predetermined height and is open in an upper portion thereof so that air drawn from the blower fan can smoothly flow through the air blowing port and be prevented from being affected by the water stored in the bottom housing.

6. The cyclone type humidifier and wet air purifier combination device as set forth in claim 1, wherein the ultrasonic vibrator generates vibrations in the stored water and thus induces an ultrasonic atomization phenomenon so that atomized water makes contact with drawn air, thereby primarily removing pollutants from the drawn air.

7. The cyclone type humidifier and wet air purifier combination device as set forth in claim 1, wherein the air guide housing has a streamline shape to make a flow of air drawn from the air blowing port smooth.

8. The cyclone type humidifier and wet air purifier combination device as set forth in claim 1, wherein a water contamination sensor is provided in the air guide housing, the water contamination sensor checking whether the stored water is contaminated.

9. The cyclone type humidifier and wet air purifier combination device as set forth in claim 1, being configured to be adjusted in function in such a way that when an RPM of the motor is comparatively low, a humidifier function is conducted, and when the RPM of the motor is comparatively high, an air purifier function is conducted.

10. The cyclone type humidifier and wet air purifier combination device as set forth in claim 1, wherein a water discharge prevention ring is provided on an inner circumferential surface of the discharge pipe.

* * * * *